Sept. 3, 1963     A. C. DICKIESON     3,102,505
SIGNAL CONTROLLED STEERING SYSTEMS
Filed Aug. 17, 1943     2 Sheets-Sheet 1
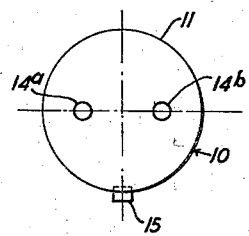
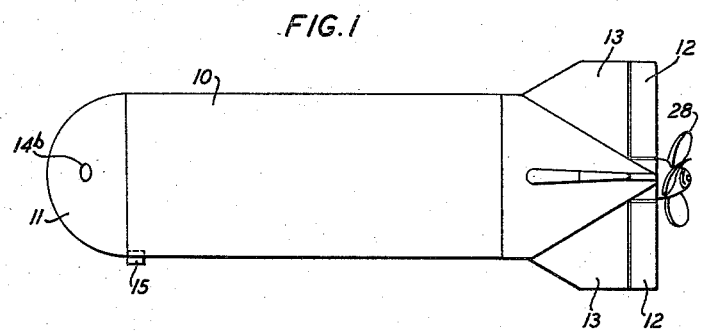
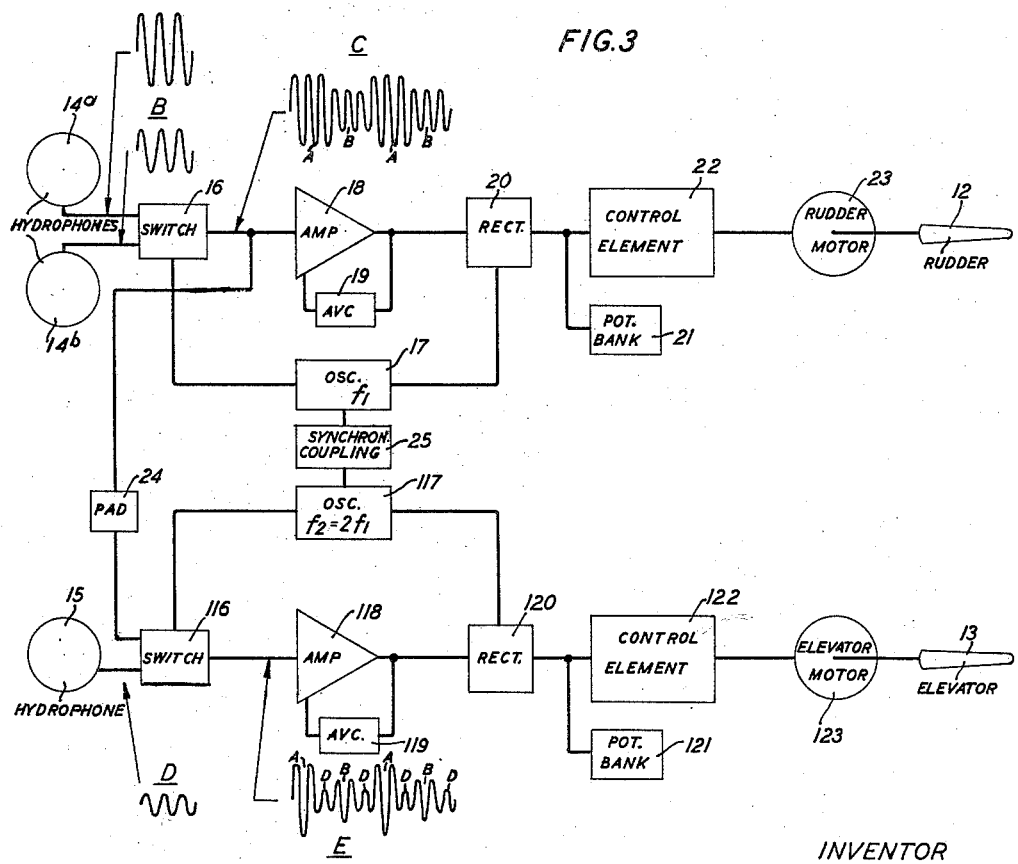
INVENTOR
A.C. DICKIESON
BY
Walter C. Kiesel
ATTORNEY Sept. 3, 1963   A. C. DICKIESON   3,102,505
SIGNAL CONTROLLED STEERING SYSTEMS
Filed Aug. 17, 1943   2 Sheets-Sheet 2

INVENTOR
A.C. DICKIESON
BY
Walter C. Kiesel
ATTORNEY

United States Patent Office 3,102,505
Patented Sept. 3, 1963

3,102,505
SIGNAL CONTROLLED STEERING SYSTEMS
Alton C. Dickieson, Mountain Lakes, N.J., assignor to Bell Telephone Laboratories, Incorporated, New York, N.Y., a corporation of New York
Filed Aug. 17, 1943, Ser. No. 498,927
10 Claims. (Cl. 114—23)

This invention relates to signal controlled steering systems for moving bodies and more particularly to steering control systems for guiding a torpedo toward a target in response to an accordance with signals emanating from the target.

In one form of signal controlled steering system for a torpedo, the vertical rudder is controlled in accordance with information derived from signals, for example random propeller noise, emanating from the target, such as a submarine, and detected by a pair of hydrophones mounted upon the torpedo, and the horizontal rudder or elevator is controlled in accordance with information derived from such signals detected at a third hydrophone mounted upon the torpedo. This third hydrophone has a directional response characteristic and is so mounted that its response is a function of the vertical angle between the longitudinal axis of the torpedo and a line from the target to the torpedo. In general, as in the system disclosed in the application Serial No. 491,795, filed June 22, 1943 of Donald D. Robertson, the outputs of the pair of hydrophones in the vertical rudder control circuit are resolved in combination into a direct current control signal related in amplitude and polarity to the bearing of the target with respect to the torpedo. In order to obtain such control signal which is proportional in amplitude to the bearing of the target and substantially independent of the absolute intensity of the signal intensities at the hydrophones, automatic volume control is provided so that the hydrophone outputs are compared or resolved on a relative rather than an absolute intensity basis.

In the horizontal rudder or elevator control circuit, automatic volume control is desired in order to obtain a control signal which is substantially independent of the absolute magnitude of the target signal intensity at the torpedo. Inasmuch as but a single directional hydrophone is utilized in the elevator control circuit, automatic volume control in the circuit in accordance with the target signal level at this hydrophone is not feasible for the reason that such mode of control throughout the range required would effectively eliminate differences in the hydrophone output due to its directional pattern and, thus, a control signal proportional to the vertical angle indicative of the position of the target with respect to the torpedo would not be realized.

One general object of this invention is to obtain, in an elevator control system for a signal guided torpedo, a control signal which is proportional to the vertical angle indicative of the position of the torpedo with respect to the target and is substantially independent of the absolute target signal intensity at the torpedo.

More specifically, one object of this invention is to realize automatic volume control in an elevator control system of the type described above, in accordance with the target signal intensity at the torpedo whereby variations in the output of the hydrophone in this system with distance between the target and the torpedo and other factors are compensated for.

Another object of this invention is to facilitate the manufacture in quantity of signal controlled steering systems for torpedoes wherein automatic volume control for the rudder and elevator control circuits is provided.

A further object of this invention is to obtain equality of, or a fixed relation between, the control signals obtained in the rudder and elevator control circuits in a signal guided torpedo.

In accordance with one feature of this invention, in a steering control system for a torpedo, of the general construction described above the output level of the elevator control circuit is controlled in accordance with the signal intensity at the hydrophones in the rudder control circuit.

More specifically, in accordance with one feature of this invention, a portion of the output of the hydrophones in the rudder control circuit is combined with the output of the hydrophone in the elevator control circuit in such manner, and the combined signal passed through an amplifier provided with automatic volume control so arranged that the gain of the amplifier is controlled substantially entirely in accordance with the output of the hydrophones in the rudder control circuit.

The invention and the above noted and other features thereof will be understood more clearly and fully from the following detailed description with reference to the accompanying drawing in which:

FIG. 1 is a side view of a torpedo which may be provided with a steering system constructed in accordance with this invention;

FIG. 2 is a front view of the nose of the torpedo illustrated in FIG. 1; showing the position of the hydrophones;

FIG. 3 is a block diagram of a signal controlled steering system illustrative of one embodiment of this invention;

Figure 5:
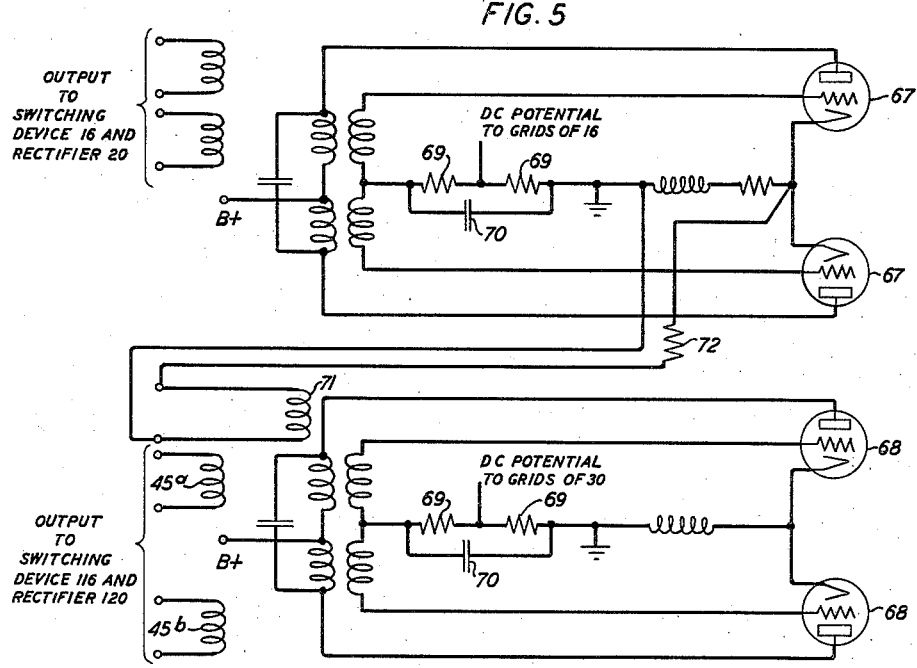
FIG. 5 is a detail circuit diagram illustrating the oscillators and the association thereof in the system shown in FIG. 3.

Referring now to the drawing, the torpedo illustrated in FIG. 1 comprises a body 10 in which the control apparatus described hereinafter is mounted, a nose 11 wherein an explosive charge, not shown, is carried, and a tail portion having a vertical rudder 12 and a horizontal rudder or elevator 13 pivotally mounted thereon. The torpedo includes also a propeller 28 and a driving means, such as a motor, therefor. The rudder 12 is controlled in accordance with target signals detected by a pair of hydrophones 14a and 14b and the elevator 13 is controlled in accordance with target signals detected by a hydrophone 15.

The hydrophones 14 may be of the directional type having the maximum response to signals incident thereon parallel to the longitudinal axis of the torpedo and may be mounted on the nose 11 as shown, or may be mounted on opposite sides of the torpedo and substantially nondirectional as in the control system disclosed in the aforementioned application of Donald D. Robertson. The hydrophone 15 has a directional response pattern, for example cosine directivity, such that the response thereof is a maximum to signals incident thereon normal to the longitudinal axis of the torpedo and is of lesser magnitude proportional to the angle of incidence for signals arriving at the torpedo in directions other than normal to the axis noted. Advantageously the several hydrophones are constructed to be especially sensitive or tuned to a preassigned frequency, e.g. 24 kilocycles per second.

The control system for the rudder 12 may be of the general organization and construction disclosed in the aforementioned application of Donald D. Robertson and comprise an input switch 16 controlled by an oscillator 17 as in the manner disclosed in the application Serial No. 491,798, filed June 22, 1943, now U.S. Patent No. 3,004,223 of Alton C. Dickieson. The switch 16 connects the hydrophones 14 in alternation, at the oscillator frequency, to the input of an amplifier 18 provided with automatic volume control 19 which controls the amplifier gain substantially in proportion to the average of the outputs of the two hydrophones 14. The output of the amplifier is supplied to a rectifier 20 controlled by oscillator 17 and the rectifier output is resolved into a direct current signal proportional in amplitude to the difference of the outputs of the two hydrophones 14, and having the polarity determined by the greater of the two hydrophone outputs. This signal is combined with a direct current signal obtained from a potentiometer bank 21 and the resultant signal is applied to a control circuit 22 which operates in accordance with the polarity of this resultant to cause operation of the reversible motor 23 to deflect the rudder 12 in the direction to steer the torpedo toward the target from which the signals detected by the hydrophones 14 emanate.

The elevator control circuit includes a switch 116 controlled by an oscillator 117 having twice the frequency of the oscillator 17 and connected to the hydrophone 15 and to the output side of the switch 16 by way of a suitable impedance pad 24, the purpose of which will be pointed out hereinafter. The oscillators 17 and 117 are coupled by a synchronizing element 25 to hold the two oscillators in step. The switch 116 operates to connect the hydrophone 15 and the rudder control circuit to the input of the amplifier 118 alternately at the frequency of the oscillator 117. The amplifier 118 is provided with automatic volume control 119 and its output is supplied to a rectifier 120, which is controlled by the oscillator 117 and is of such construction, as described hereinafter, that its output comprises only the component of the output of the amplifier 118 due to the hydrophone 15. The direct current signal obtained from the rectifier 120 is combined with a direct current signal obtained from a potentiometer bank 121 and the resultant energizes the control circuit 122 in such manner that the reversible motor 123 deflects the elevator 13 in the direction to steer the torpedo toward the target.

By virtue of the action of the automatic volume control 19, the control signal due to the hydrophones 14 obtained in the rudder control circuit is dependent upon the bearing of the target with respect to the torpedo and is substantially independent of the absolute target signal intensity at the hydrophones 14. Similarly, by virtue of the action of the automatic volume control 119 and the association of the elevator control system with the rudder control system, the control signal due to the hydrophone 15 obtained in the elevator control system also is substantially independent of the absolute target signal level at the hydrophone 15 and is proportional to the angle of incidence of the target signals upon the hydrophone 15. The nature of the action of the automatic volume control 119 will be understood from the following consideration with reference to FIG. 3.

In FIG. 3, the forms of the signals at various points in the system are indicated. In an actual system operating upon random propeller noise, the signals detected and translated are of complex character. For purposes of simplicity, the wave forms have been idealized in FIG. 3, although it will be manifest from the following discussion that this idealization does not affect the principles of operation involved in the system. For purposes of illustration, it has been assumed that the torpedo is in such position relative to the target that the output of the hydrophone 14a is greaer than that of the hydrophone 14b. The pad 24 is of such construction that the amplitude of the signal supplied to the switch 116 from the rudder control system is greater than that supplied by the hydrophone 15.

The output of the hydrophone 14a is of the idealized form indicated at A, i.e., a high frequency, e.g. 24 kilocycle, wave. The output of the hydrophone 14b is of the idealized form indicated at B, i.e., a high frequency, e.g. 24 kilocycle, wave, of smaller amplitude than A. The switching frequency, $f_1$, is relatively low, e.g. of the order of 115 cycles per second and the switching frequency, $f_2$, is twice $f_1$, i.e., 230 cycles per second. At the output of the switch 16, the signal is of the form indicated at C, i.e., a wave composed of alternate portions of equal period corresponding to the signals A and B as indicated. The output of the hydrophone 15, illustrated at D, is a high frequency, e.g. 24 kilocycle, wave.

The switch 116 operates at twice the frequency of the switch 16, as noted above. Hence, at the output of the switch 116, the signal form is as illustrated at E and is composed of half cycle pulses corresponding to the signal D between half cycle pulses corresponding to the signals A and B as indicated. In other words, by action of the switch 116, the combined signals A and B as they appear at the output of the switch 16 and the signal D are commutated at the frequency $f_2$. The resulting signal E is applied to the input of the amplifier 118.

The gain of the amplifier 118 is varied by the automatic volume control 119 in inverse proportion to the amplitude of the input signal to the amplifier. Inasmuch as the amplitude of the portion of the input signal obtained from the rudder control circuit is greater than that of the portion obtained from the hydrophone 15, the average gain of the amplifier 118 over the commutating cycle will be determined predominantly by the amplitude of the first portion noted. Consequently, the output level of the amplifier 118 is substantially independent of the absolute magnitude of the signals detected by the hydrophone 15. However, as will be apparent, the portion of the output of the amplifier 118 corresponding to the signal D will be proportional to the amplitude of this signal, and, therefore, proportional to the angle of incidence of the target signals upon the hydrophone 15.

The rectifier 120 is controlled by the oscillator 117 in such manner, as described hereinafter, that the output thereof comprises two direct current components, one proportional to the signal D and the other proportional to the signals A and B in combination. The latter portion is dissipated in a suitable impedance network. The former is combined with the direct current signal obtained from the potentiometer bank 121 and the resultant is impressed upon the control circuit 122.

Figure 4:
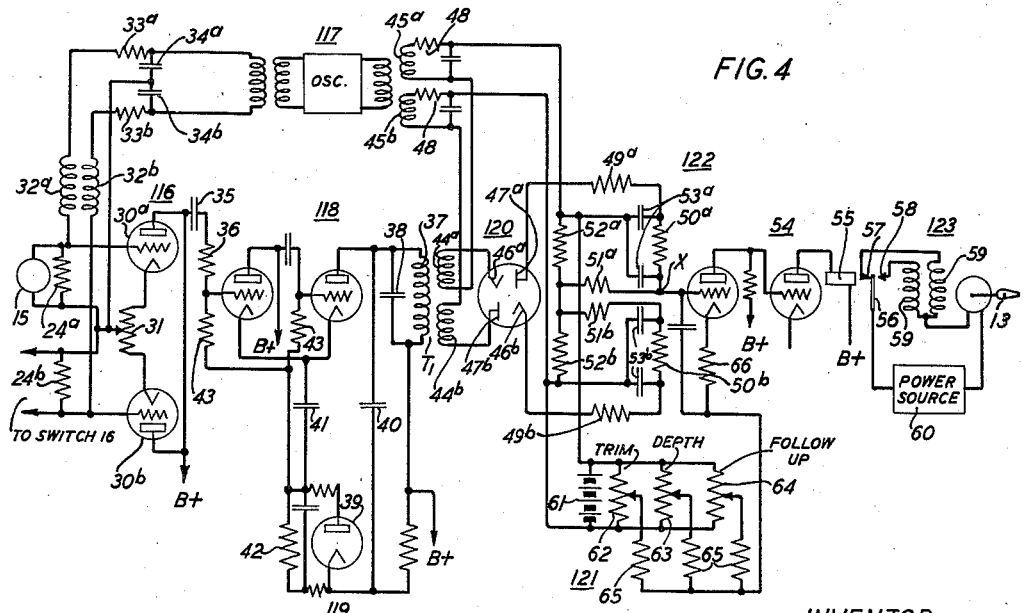
FIG. 4 is a circuit diagram of the elevator control portion of the system illustrated in FIG. 3.

A specific elevator control circuit of the configuration shown in FIG. 3 is illustrated in FIG. 4. In the system shown in FIG. 4, all the cathodes of the several tubes are connected to ground either directly or through suitable resistances. For the sake of simplicity, these connections have not been shown in the drawing. The hydrophone 15 is connected across an input resistor 24a and the output voltage of the switch 16 is impressed across an input resistor 24b, the two resistors being correlated so that the potential impressed across the resistor 24b is greater than that applied across resistor 24a. The resistors 24 are included in the respective input circuit of a pair of similar tubes 30a and 30b, which circuits include also a potentiometer resistance 31 enabling balancing of the two circuits. The circuits noted are connected also to the oscillator 117, by way of suitable inductance coils 32a and 32b, resistances 33a and 33b and condensers 34a and 34b, as in the manner disclosed in the application Serial No. 491,798, filed June 22, 1943 of Alton C. Dickieson. As described fully in that application, the oscillator provides both the direct current bias for the control grids of the tubes 30 and a switching potential, such that the tubes 30 are biased at cut-off and are rendered conductive alternately at the frequency of the oscillator 117. The anodes of the tubes 30 are connected together directly and to the control grid of the first stage of the amplifier 118 by way of the condenser 35 and resistance 36. As pointed out heretofore in the description of FIG. 3, the signal impressed upon the control grid of the first stage of the amplifier 118 is composed of half cycle pulses, of the frequency of oscillator 117, one group of pulses corresponding to the voltage obtained from the hydrophone 15 and interposed with pulses obtained from the rudder control circuit.

The first stage of the amplifier 118 is resistance condenser coupled to the second stage, as shown, the output circuit of which includes the secondary winding 37 of the transformer T, and which may be tuned to the switching frequency by a condenser 38. A portion of the output voltage of the amplifier 118 is applied across a diode rectifier 39, by way of condensers 40 and 41 whereby a direct current potential proportional to the amplifier output is established across the resistor 42. From what has been said hereinabove in the description of FIG. 3, it will be noted that the direct current potential appearing across the resistor 42 will be of an amplitude determined substantially by the voltage impressed across the input resistor 24b and, hence, be dependent upon the signal intensities at the hydrophones 14. The resistor 42 is connected to the grid circuits of the two tubes of the amplifier 118 through suitable resistances 43 so that the grid bias is determined by the signal intensities noted. Hence, the overall gain of the amplifier 118 varies in inverse proportion to the signal intensities at the hydrophones 14 and the output level of the amplifier is maintained substantially constant and independent of the signal level at the hydrophone 15. The component of the output of amplifier 118 corresponding to the output of the hydrophone 15 is proportional to the angle of incidence of target signals upon the hydrophone 15.

The transformer $T_1$ comprises two similar secondary windings 44a and 44b each of which is associated with a corresponding output winding 45a or 45b of the oscillator 117 and with a corresponding diode rectifier element 46a, 47a or 46b, 47b of the rectifier 120. In order to prevent undesired singing in the control system, suitable resistance condenser filter elements 48 may be associated with the windings 45 as shown. Associated with the diode rectifier elements 46, 47 are similar resistance condenser networks each composed of resistances 49, 50, 51 and 52 and smoothing condensers 53, each of these impedances being identified in the drawing by the letter of the corresponding diode element. The cathodes 46 of the diode elements are biased at the cut-off point by a suitable source, not shown, and the voltages supplied by the windings 45 are such as to overcome the bias whereby the two diode elements are rendered conductive alternately at the frequency of the oscillator 117 and in synchronism with the alternate operation of the input switching tubes 30. In a typical system, the resistances 49 and 50 may be of the order of 100,000 ohms each, the resistances 52 may be of the order of 10,000 ohms each, the resistances 51 may be of the order of one megohm each and the condensers 53 may be of the order of 0.1 microfarad each.

During the half cycles when the tube 30a is conductive, the diode element 46a, 47a also conducts so that a direct current of amplitude proportional to the voltage impressed across the resistor 24a, flows through the resistance 50a. The circuit through the resistance 50a may be traced from the cathode 46a, through windings 44a and 45a, then through resistances 52a, 51a, 50a and 49a to the anode 47a. During the half cycles when the tube 30 is conductive, the diode element 46b, 47b, conducts and a direct current of amplitude determined by the outputs of the hydrophones 14, flows through the resistance 50b, the circuit being traced in the same way as that for the resistance 50a. The condensers 53 substantially eliminate ripples due to the switching and signal frequencies. The current through the resistance 50b is dissipated in the associated resistances. Flow of current through the resistance 50a results in variation in the potential, with respect to ground, of the terminal X of the resistance and, thus, provides a potential which is utilized to effect elevator control in accordance with the output of the hydrophone 15.

The control of the elevator 13 is effected by way of a direct current amplifier 54 which may have two stages as shown. The output circuit of the amplifier 54 includes a relay 55 having an armature 56 and a pair of contacts 57 and 58 each of the contacts being connected to a corresponding field winding 59 of the elevator motor 123. The energizing circuit for the motor includes the power source 60, the armature 56, and one or the other of the contacts 57 and 58 and the corresponding field winding 59. The direction of rotation of the motor is determined by which of the field windings is energized and the energization of the windings is determined, in turn, by the operation of the direct current amplifier 54. When the potential impressed upon the grid of the first stage of the amplifier is of one polarity, or above a preassigned value, the relay 55 operates to close one of its contacts; when this potential is of the opposite polarity, or below the preassigned value, the relay releases to close the other of its contacts. The amplitude and polarity of the potential noted are determined by the relative amplitudes of the target signal and potentiometer potentials and the polarity of the latter as will be understood from the following considerations.

The potentiometer bank 121 comprises a source, such as a battery 61, which is connected across the resistances 52 in series, and a group of potentiometer resistances 62, 63 and 64 connected in parallel across the source 61. The contact arms of the potentiometer resistances are connected together, through suitable resistances 65 for adjusting the relative sensitivities of the several potentiometer controls, and to the cathode of the first stage of the amplifier 54 through a resistance 66. As described, for example, in the application Serial No. 491,794, filed June 22, 1943 of Hugh K. Dunn, the contact arm of the resistance 62 may be pendulum operated to control the trim of the torpedo, the contact arm of the resistance 63 may be pressure operated in accordance with the depth of submersion of the torpedo and the contact arm of the resistance 64 may be coupled or geared to the elevator.

Normally, that is, when the several potentiometer contact arms are in center position and no signals are being received at the hydrophone 15, both the cathode and grid of the first stage of the amplifier 54 are at the potential of the mid-point of the battery 61. When a target signal is received or when any contact arm moves off center, a potential difference is established between the cathode and grid, the amplitude of the component due to the signal being proportional to the hydrophone output as noted heretofore and the amplitude and polarity of the potentiometer component being proportional to the amplitude and direction respectively of the contact arm displacement. At any instant during operation, then, the potential of the grid is the resultant of two potentials, one due to the target signal and the other to the potentiometer bank.

Either of two modes of operation may be employed. In one mode, the sensitivities of the target signal and potentiometer controls may be correlated so that during the entire run of the torpedo to the target both signal and potentiometer controls are effective except that stops are provided to limit the displacement of contact arms associated with the resistances 62 and 63 so that when the torpedo comes into proximity to the target the signal control can overcome the trim and depth controls and thus cause the torpedo to strike the target. In the other mode, suitable means, such as disclosed in the application of D. D. Roberston aforementioned, may be provided to disconnect the trim and depth control potentiometers whenever the target signal intensity at the hydrophone 15 is above a preassigned level so that when the torpedo comes into proximity to the target the elevator is controlled only in accordance with the target signal and follow up potentials. In either case, the depth control potentiometer 63 is constructed so that the contact arm thereof is in center position when the torpedo is traveling at a prescribed depth less than the probable depth of submersion of the target.

As pointed out heretofore, the frequency of the oscillation 117 is twice that of the oscillator 17 and in order to insure in step operation of the two oscillators and exact 2 to 1 relation of the oscillator frequencies, the two oscillators are asociated by a synchronizing coupling 25. One way of asociating the oscillators is illustrated in FIG. 5. The oscillators 17 and 117 are of the push-pull type similar to that disclosed in the above-identified application of A. C. Dickieson, are balanced and each comprises a pair of tubes 67 and 68, respectively having coupled plate and grid circuits as shown. The common grid branch of each includes a pair of resistances 69, bridged by a condenser 70, by way of which the direct current bias for the grids of the input switching tubes is obtained. A portion of the alternating current potential in the common branch of the oscillator 17 is fed to a coil 71 coupled to the windings in the plate circuit of the oscillator 117, a suitable resistor 72 being provided in circuit with the coil 71. It will be appreciated that only even harmonics of the frequency $f_1$ of the oscillator 17 flow through the winding 71 so that the coupling is effective to produce exact in step operation of the two oscillators.

As has been pointed out hereinabove, the gain of the amplifier 118 is controlled substantially entirely in accordance with the signal obtained from the rudder control circuit and impressed across the input resistor 24b. The automatic volume control potential obtained in the elevator control circuit is proportional to the R.M.S. average of the outputs of the hydrophones 14a and 14b so that the gain of the amplifier 118 is substantially independent of the bearing of the torpedo with respect to the target. The gain of the amplifier 18 also is determined by the R.M.S. average of the outputs of the hydrophones 14a and 14b. Equality of output from the two amplifiers 18 and 118 is, then, a matter of only the direct current biases provided on the two amplifiers and is not dependent upon the individual characteristics of the tubes in the first stages of the two amplifiers. Thus, manufacture of control systems in quantity is facilitated.

Although a specific embodiment of the invention has been shown and described, it will be understood that it is but illustrative and that various modifications may be made therein without departing from the scope and spirit of the invention as defined in the appended claims. For example, although in the embodiment shown and described the gain of the amplifier 118 is controlled in accordance with the output of the amplifier, the volume control circuit could be controlled in accordance with the output of the diode element 46b, 47b so that, as in the specific system described, the target control signal for the elevator is proportional to the angle of incidence of target signals on the hydrophone 15 and independent of the absolute level of such signals. Also, although the frequency of the oscillator 117 has been described as double that of the oscillator 17, the relation may be reversed, that is, the frequency of oscillator 17 may be twice that of the oscillator 117.

What is claimed is:

1. A signal controlled steering system for a moving body comprising a steering member, a signal translating device on the body and having a directional response characteristic, an amplifier for amplifying the output of said device, a control circuit associating said amplifier with said member, and means for controlling the gain of said amplifier so that the output level thereof is substantially independent of the intensity level of signals received by said device, said means comprising signal translating means responsive to said signals and effective to produce an output signal proportional to the intensity level thereof, means for connecting said device and translating means to the input of said amplifier alternately at a prescribed frequency, means for connecting the output of said amplifier to said control circuit periodically and in synchronism with the connection of said device and translating means to the input of said amplifier and means for controlling the gain of said amplifier substantially in proportion to the output of said translating means.

2. A signal controlled steering system in accordance with claim 1 wherein said translating means comprises a pair of signal translating devices mounted on the body, said system comprising also means for commutating the outputs of the devices of said pair at a frequency bearing a 1:2 relation to said prescribed frequency, means for supplying the commutated output to said first connecting means, a second steering member, and means for controlling said second steering member in accordance with the outputs of said pair of devices.

3. A torpedo comprising a rudder, an elevator, a control circuit for said rudder including hydrophone means, a control circuit for said elevator including a directional hydrophone, an amplifier associated therewith and control means for deflecting said elevator energized by said amplifier, and means for controlling the gain of said amplifier in accordance with the signal level at said hydrophone means, said gain controlling means comprising means for connecting said hydrophone means and said hydrophone to said amplifier in alternation, means for adjusting the relative amplitudes of the signals supplied to said amplifier such that the signal supplied by said hydrophone means is greater than that supplied by said hydrophone, automatic volume control for said amplifier energized in accordance with the output thereof, and means for connecting said amplifier to said control means periodically and in synchronism with the connection of said hydrophone means and hydrophone to said amplifier.

4. A torpedo comprising a rudder, an elevator, a control circuit for said rudder including a pair of hydrophones, an amplifier therefor, means for commutating the outputs of said hydrophones at a preassigned frequency connected between said hydrophones and said amplifier and means for controlling the gain of said amplifier in accordance with the signal intensity at said hydrophones, a control circuit for said elevator comprising a directional hydrophone and an amplifier therefor, and means for controlling the gain of said second amplifier in accordance with said signal intensity comprising means for supplying to the input of said second amplifier in alternation at a frequency bearing a 2:1 relation to said preassigned frequency, signals corresponding to the output of said directional hydrophone and to the commutated outputs of said pair of hydrophones and automatic volume control means energized in accordance with the output of said second amplifier.

5. A signal translating system comprising a signal translating device having a directional response characteristic, an amplifier therefor, an output circuit for said amplifier, means for connecting said amplifier operatively to said circuit periodically at a prescribed frequency, and means for controlling said amplifier so that the signal supplied thereby to said output circuit is proportional to the angle of incidence of signals upon said device and substantially independent of the absolute level of such signals, said means comprising means for producing a control signal proportional to said level, means for supplying said control signal and the output of said device to the input of said amplifier alternately at said prescribed frequency and in synchronism with the connection of said amplifier to said output circuit, and means energized by the output of said amplifier for controlling the gain of said amplifier in proportion to said control signal.

6. A signal translating system comprising a pair of channels each having a translating element therein, means for commutating the outputs of the elements at a prescribed frequency, a third channel having a translating device therein, an amplifier, means for supplying to said amplifier, in alternation and at a second frequency bearing a 2:1 relation to said prescribed frequency, signals corresponding to the output of said device and signals corresponding to the commutated outputs of said elements, a pair of networks, and means for connecting said networks to the output of said amplifier alternately and at said second frequency.

7. A signal translating system in accordance with claim 6, comprising a second amplifier, an output means coupled thereto, means for supplying a signal corresponding to said commutated output to said second amplifier, and means for controlling the gain of both said amplifiers in accordance with the average of the outputs of said elements.

8. A signal translating system in accordance with claim 6 wherein said commutating means includes a switch and an oscillator controlling the operation of said switch and said supplying means includes a second switch and a second oscillator controlling the operation thereof, said system comprising also a synchronizing coupling between said oscillators.

9. In a signal translating system, a first oscillator comprising a pair of electron discharge devices connected in push-pull relation and having an oscillating branch common to said pair of devices, a second oscillator comprising a pair of electron discharge devices connected in push-pull relation and having an oscillating plate circuit, said second oscillator having an operating frequency twice that of said first oscillator, and means for impressing a portion of the alternating potential in said branch upon said oscillating plate circuit.

10. A signal translating system comprising a signal translating device having a directional response pattern, a direct current load element, and means for resolving the output of said device into a direct current signal for operating said device, proportional to the incidence angle of signals upon said device and substantially independent of the intensity level of said signals, said means comprising an amplifier, a rectifier connected to the output of said amplifier having two rectifier elements one of which is connected to said load element, signal translating means the response of which is proportional to the signal intensity level thereat, means for supplying signals corresponding to the outputs of said device and translating means to said amplifier in alternation at a prescribed frequency, means for rendering said rectifier elements conductive alternately at said frequency, and means operated by the output of said amplifier for controlling the gain of said amplifier in accordance with the output of said translating means.

No references cited.